United States Patent [19]

Volk

[11] 4,378,716
[45] Apr. 5, 1983

[54] RIPPER ATTACHMENT FOR MULTI-PURPOSE WOODWORKING POWER TOOL GUIDE TABLE

[76] Inventor: Michael J. Volk, 216 McKeon Rd., Severna Park, Md. 21146

[21] Appl. No.: 204,065

[22] Filed: Nov. 4, 1980

Related U.S. Application Data

[63] Continuation-in-part of Ser. No. 128,554, Mar. 10, 1980, Pat. No. 4,320,678.

[51] Int. Cl.³ .................. B27B 19/06; B27B 27/02
[52] U.S. Cl. .................................. 83/438; 83/574; 83/746; 83/522
[58] Field of Search .............. 83/574, 471.3, 486.1, 83/522, 435.1, 438, 648, 746, 432, 762, 441.1; 269/295, 293

[56] References Cited

U.S. PATENT DOCUMENTS

| | | | |
|---|---|---|---|
| 2,630,147 | 3/1953 | Garberg | 83/574 |
| 3,727,502 | 4/1973 | Steinman | 83/471.3 |
| 3,763,733 | 10/1973 | Jambor | 83/766 |
| 4,197,775 | 4/1980 | Handler et al. | 83/471.3 |
| 4,320,678 | 3/1982 | Volk | 83/574 |

FOREIGN PATENT DOCUMENTS 2037655 7/1980 United Kingdom ............... 83/574

*Primary Examiner*—Donald R. Schran
*Attorney, Agent, or Firm*—Brady, O'Boyle & Gates

[57] ABSTRACT

A guide table for diverse power woodworking tools includes a pair of laterally relatively adjustable power tool guide rails. Ripping of lumber by means of a sabre saw is enabled by the addition to the table of a sabre saw blade guide slot perpendicular to the guide rails, the provision of a precision adjustable lumber guide on the table parallel to the sabre saw guide slot and the provision on one guide rail of a quick attachable and removable locator device for the sole plate of a sabre saw which requires only an initial adjustment to allow subsequent usage with the same sabre saw. An adjustable lumber hold-down element is provided on one guide rail of the table.

12 Claims, 8 Drawing Figures

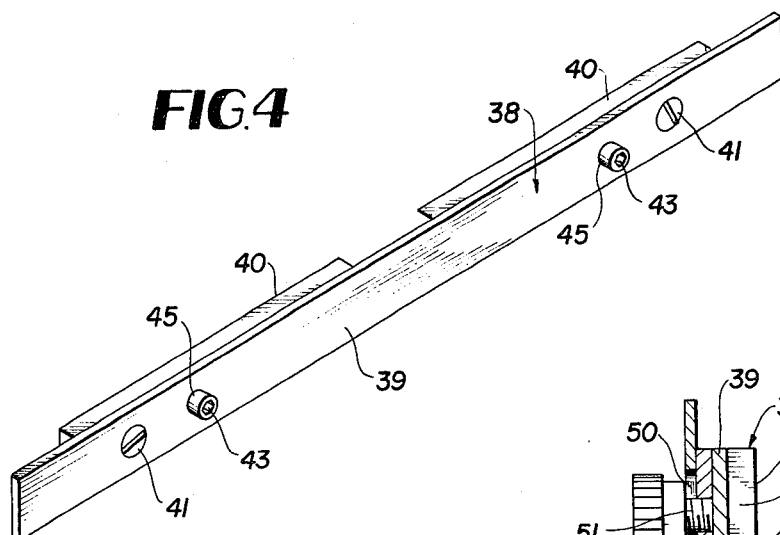
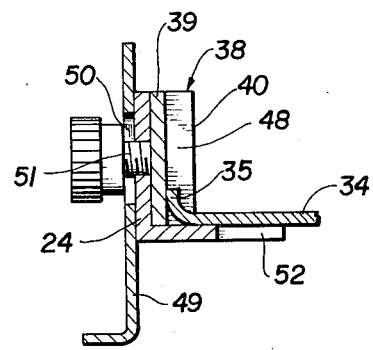
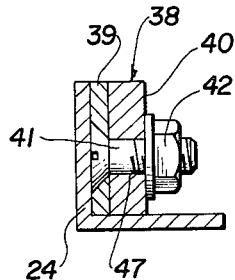
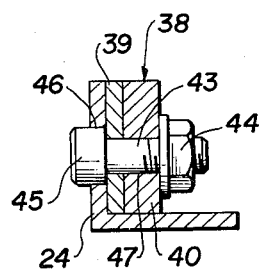
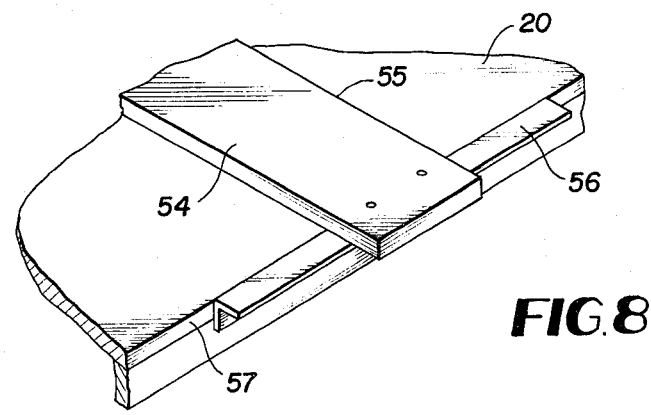

RIPPER ATTACHMENT FOR MULTI-PURPOSE WOODWORKING POWER TOOL GUIDE TABLE

CROSS-REFERENCE TO RELATED APPLICATION

This application is a continuation-in-part of copending application Ser. No. 06/128,554, filed Mar. 10, 1980 now U.S. Pat. No. 4,320,678, for PORTABLE POWER TOOL ACCESSORY TABLE.

BACKGROUND OF THE INVENTION

Guide tables for power saws, such as sabre saws and portable circular saws, are known in the prior art. Such tables commonly include a pair of parallel guide rails, at least one of which can be laterally adjusted relative to the other. Such a guide table for diverse power woodworking tools is shown in the referenced patent application. The arrangement enables the use selectively along the two guide rails of a sabre saw, circular saw or router. The table in the patent application also includes a protractor which allows the cutting off of lumber workpieces at various precision angles.

The objective of the present invention is to provide means in the nature of a simple attachment to a table of the above type which will impart thereto an additional important capability not heretofore provided in the prior art, namely, the capability of ripping large lumber pieces with precision and speed by use of a sabre saw.

This new capability is imparted to the table by the addition thereto of a sabre saw blade guide slot perpendicular to the guide rails, the provision on the table of a precision adjustable lumber guide parallel to the added saw blade guide slot, and the provision on one guide rail of a quick attachable and removable locator and holding device for the sole plate of a sabre saw. A vertically adjustable lumber hold-down element on one guide rail is also provided to prevent lumber chattering during the ripping operation. A feature of the simple attachment is that only an initial adjustment of the sole plate locating means is required, after which the same sabre saw can be used repeatedly in the lumber ripping mode without any further adjustment of the attachment. In a table equipped with the invention, the same sabre saw can be employed on the table guide rails selectively in two right angular positions for lumber cutoff operations with the saw moving along the guide rails, or for lumber ripping operations with the saw turned ninety degrees relative to the guide rails and held stationary thereon by the sole plate locator means while the lumber to be ripped is fed across the guide rails and into the blade of the sabre saw.

Other features and advantages of the invention will become apparent during the course of the following description. While lumber is referred to throughout the description and claims, it is to be understood that this term includes material other than lumber that may be ripped by use of the attachment.

BRIEF DESCRIPTION OF THE DRAWINGS

FIG. 4 is a perspective view of an adjustable locator and holding attachment for the sole plate of a sabre saw in the lumber ripping mode.

FIG. 5 is an enlarged fragmentary vertical section taken on line 5—5 of FIG. 2.

FIG. 6 is a similar section taken on line 6—6 of FIG. 2.

FIG. 7 is a similar section taken on line 7—7 of FIG. 2.

FIG. 8 is a fragmentary perspective view of an adjustable lumber guide for the table when in the ripping mode.

DETAILED DESCRIPTION

Figure 1:
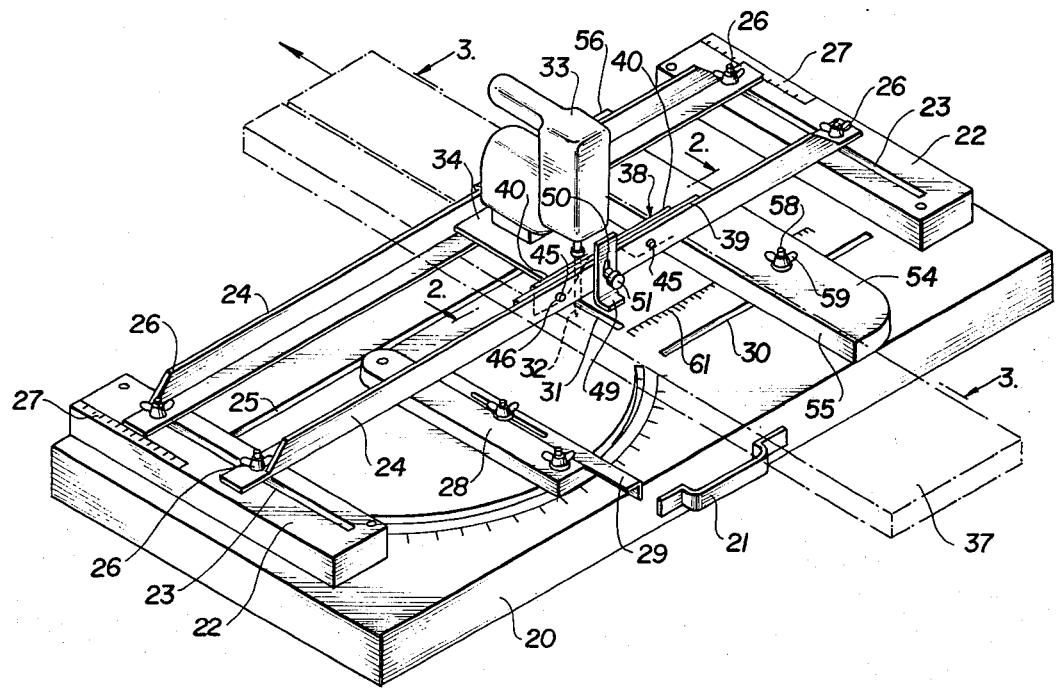
FIG. 1 is a perspective view of a woodworking power tool guide table equipped with a ripper attachment in accordance with the invention.

Referring to the drawings in detail wherein like numerals designate like parts, a multi-purpose woodworking power tool guide table comprises a table body portion 20 in the nature of a rectangular plate which may include a carrying handle 21 attached to one edge thereof. Block members 22 fixed to the table body portion near the opposite ends thereof include guide slots 23 for adjustable parallel guide rails 24 in the form of angle bars as described in the referenced patent application. A longitudinal slot 25 in table body portion 20 may receive the blade of a portable circular saw or the blade of a sabre saw during the use of either power tool on the guide table in the performance of various cutting operations.

The outside guide rail 24 is adjusted and locked by locking means 26 relative to the center line of slot 25 by reference to precision indicator scales 27 provided along the blocks 22. The inner rail is then adjusted laterally and locked by additional locking means 26 to provide the necessary spacing between the two guide rails for the sole plate of the power tool being moved along the guide rail, whether a sabre saw, circular saw or router, as disclosed in the prior application.

A protractor means 28 including an adjustable workpiece guide member 29 also forms a part of the guide table in the prior application to enable simple mitering cuts in workpieces and cutoff operations at various angles to the axis of the guide rails 24. In the prior application, a pressure block assembly, not shown herein, to exert holding pressure on a workpiece abutting the protractor guide 29 is provided and the adjusting slot 30 for this pressure block assembly formed in the table body portion 20 in spaced parallel relationship to the slot 25 is shown herein and is used in a different manner, to be described.

In accordance with the present invention, a second clearance slot 31 adapted to receive the blade 32 of a sabre saw 33 when used in the lumber ripping mode is formed in the table body portion 20 at right angles to the slot 25 and generally centrally of the table. The sole plate 34 of sabre saw 33 has an upturned leading end extension 35, FIG. 5, to be further mentioned, and the sole plate 34 is bifurcated at its leading end adjacent to the saw blade 32 as shown at 36, FIG. 2. The same sabre saw 33 used to rip lumber herein may be used for the various cut-off operations described in the prior application where the sabre saw travels along the guide rails 24, at right angles to its position shown in FIG. 1. As will be further described, the sabre saw is fixed relative to the rails 24 and merely supported thereon during the ripping of lumber such as the lumber workpiece 37 shown in FIGS. 1 and 2.

A very important aspect of the invention resides in the use of a quick attachable and removable locator unit 38 or attachment to locate and hold the sole plate 34 of the sabre saw securely when the saw is used in the ripping mode, and particularly to resist upward displacement of the sole plate 34 under influence of the vertically reciprocating blade 32 which cuts upwardly.

The sole plate locator unit 38 comprises a mounting plate 39 which abuts the vertical flange of interior angle bar guide rail 24 with its lower edge resting on the horizontal flange of this guide rail. The unit 38 further comprises a pair of opposing longitudinally adjustable bars 40 on the face of the mounting plate 39 toward the far guide rail 24 and secured to the mounting plate by flat head screws 41, the heads of which are received in countersunk openings of the mounting plate 39, FIG. 6. The screws 41 carry nuts 42 and washers, as shown. Additionally, a pair of allen screws 43 carrying nuts 44 and disposed inwardly of screws 41 are employed to secure the bars 40 to mounting plate 39 and the cylindrical heads 45 are received through locator openings 46 in the vertical web of interior guide rail 24, as shown clearly in FIG. 7, to position the unit 38 with precision on this guide rail.

Figure 2:
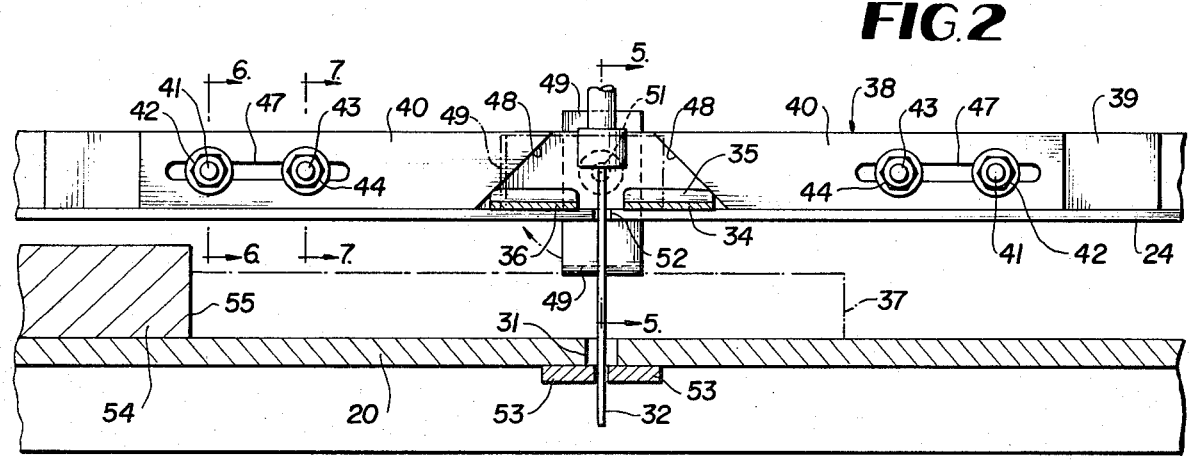
FIG. 2 is an enlarged fragmentary vertical section taken on line 2—2 of FIG. 1.
Figure 3:
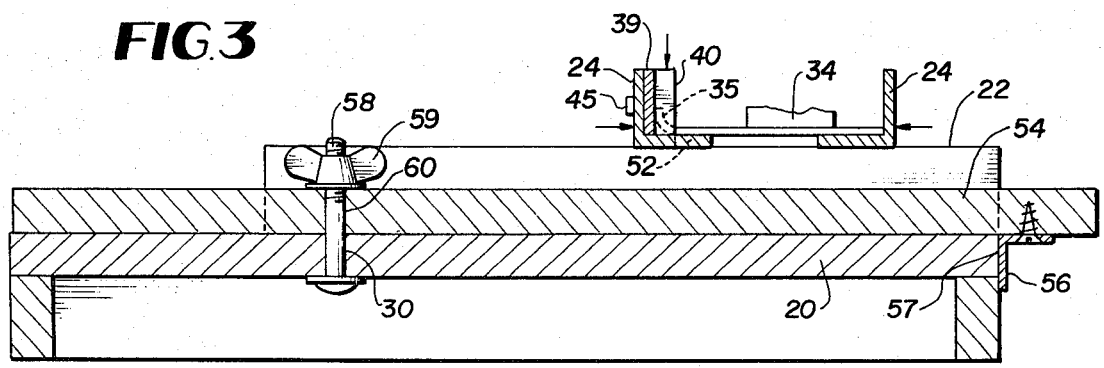
FIG. 3 is a vertical section at right angles to FIG. 2 taken on line 3—3 of FIG. 1.

The two bars 40 have longitudinal adjusting slots 47 formed therethrough and the pairs of screws 41 and 43 pass through these adjusting slots as shown in FIGS. 6 and 7 and also in FIG. 2. When the nuts 42 and 44 are tightened, the two bars 40 are securely locked in their selected longitudinally adjusted positions relative to the sabre saw sole plate 34. In this connection, the bars 40 have inclined upwardly converging end faces 48 which engage the upturned extension 35 of sole plate 34 at the opposite sides of the sole plate to prevent the sole plate from rising during the operation of the saw. When a particular sabre saw is employed to rip lumber and is placed properly on the two rails 24 following their proper adjustment, it is only necessary to adjust the two bars 40 once into contact with the extension 35, and thereafter the same sabre saw can be reinstalled on the table in the ripping position any number of times without requiring readjusting of the bars 40 of locating and holding unit 38. This is an important convenience feature of the invention.

Of equal importance and convenience is the simple procedure of installing the unit 38 on the table. After proper adjustment of the rail 24 to accept the sabre saw sole plate 34, the unit 38 can simply be placed on the inside rail 24 by introducing the cylindrical screw heads 45 through the pilot openings 46 in the adjacent rail 24. Thereafter, the sole plate 34 is placed down on the horizontal flanges of rails 24 with its lip or extension 35 beneath the hold-down end faces 48. The pressure which the far rail 24 exerts against the back of the sole plate 34 assures that the upturned extension 35 will press on the mounting plate 39, FIG. 5, and hold the unit 38 in the use position on the table without other attachment means.

The invention further comprises a workpiece hold-down element 49 of L-configuration having a vertical adjustment slot 50 receiving a clamping set screw 51 held in a threaded opening of the vertical flange of interior rail 24. By this means, the element 49 can be adjusted to contact the top face of lumber workpiece 37 and lock by set screw 51. This prevents vertical displacement or chattering of the workpiece during the ripping operation as depicted in FIG. 1. Both FIGS. 1 and 2 show clearly the passage of the workpiece 37 across the top of table body portion 20 and under the two rails 24 and associated elements and under the adjustable hold-down element 49. As shown in the drawings, the horizontal flange of interior rail 24 has a clearance notch 52 for sabre saw blade 32.

To prevent lateral deviations of the saw blade 32 during the ripping operation, a pair of closely spaced parallel plates 53 are fixed to the undersurface of table body portion 20 in alignment with the larger clearance slot 31 for the saw blade. The two plates 53 define a narrow slot for the blade 32 making it impossible for the reciprocating blade to deviate from the vertical during operation. A similar feature is disclosed in the prior referenced application in connection with the longitudinal slot 25.

The invention additionally comprises a workpiece guide member 54 which lies on table body portion 20 and provides a straight edge 55 for the precision guidance of the workpiece during the ripping operation. At its rear end, the guide member 54 carries a rigid crosshead 56 similar to a T-square crosshead which slidably abuts the adjacent rear edge 57 of table body portion 20. Near its end remote from the crosshead 56, guide member 54 is equipped with an adjusting clamp screw 58 carrying a winged nut 59. The clamp screw or bolt 58 passes through the previously-described slot 30 in table body portion 20 and through an opening 60 formed in the member 54. By this means, the guide member 54 can be adjusted laterally along the slot 30 and locked in the selected adjusted position while maintaining the perpendicular relationship of the guide face 55 to the axes of rails 24.

To enable the precision lateral adjustment of lumber or material guide member 54, a graduated scale 61 on the table body portion 20 parallel to the slot 30 has its zero graduation adjacent the center line of blade slot 31, that is, at the side edge of a blade in the slot that faces guide member 54, and extends away from this position toward the far end of slot 30. By utilizing the measuring scale 61, the guide member 54 can be adjusted laterally and locked by the screw 58 to rip the workpiece 37 longitudinally at exactly the desired location measured transversely of the workpiece.

It may be seen that the material ripping attachment according to the invention is simple in construction and also simple and convenient to install, adjust and remove from the multi-purpose guide table for diverse power tools. When the sabre saw 33 is lifted from the rails 24 for use in a different mode on the guide rails 24 or for replacement by a different power tool, the locator unit 38 can simply be lifted from the table without the necessity for removing screws or any other fastener. At such time, the hold-down element 49 can merely be swung ninety degrees on the axis of set screw 51 and locked by the set screw in the phantom line position shown in FIG. 2. The guide member 54 is easily removable from the table and can be replaced by the pressure block assembly shown in the prior application where various other operations are carried out, as described therein. It should be understood that the ripper attachment is not limited in its use to the particular table shown in the prior referenced application, but can be employed independently on a table member having a pair of adjustable supports or abutments to engage the sole plate 34, an adjustable guide for the edge of the lumber undergoing ripping, and a suitable slot for the blade of the sabre saw.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A device to enable ripping of material by a portable power saw comprising a table member having a saw blade slot, first and second abutment members on the table member, means to adjust and lock at least one abutment member relative to the other whereby the space between said abutment members may be varied, a portable power saw positioning means carried by one abutment member including an elongated plate body portion, a pair of opposing elements on said elongated plate body portion having spaced end faces directed toward each other and adapted to engage opposite upper portions of a portable saw sole plate to prevent upward and lateral displacement of the sole plate which also engages the other abutment member, and at least one of the opposing elements of said pair of opposing elements being adjustable and lockable on said plate body portion relative to the other of the opposing elements.

2. A device to enable ripping of material as defined in claim 1, and said positioning means comprising a portable unit having removable interlocking engagement with said one abutment member.

3. A device to enable ripping of material as defined in claim 2, and said one abutment member having a pair of spaced locator openings and said unit having a pair of cooperative projections to interlock with said openings.

4. A device to enable ripping of material as defined in claim 1, and said pair of opposing elements comprising a pair of plate elements having inclined end faces which are convergent for engagement above a portable saw sole plate.

5. A device to enable ripping of material as defined in claim 1, and an adjustable material hold-down element connected with one of said abutment members to prevent chattering of material during ripping thereof.

6. A device to enable ripping of material as defined in claim 1, in which said first and second abutment members comprise a pair of parallel guide rails, and wherein the portable power saw is a sabre saw positioned transversely of said pair of guide rails.

7. A device to enable ripping of material as defined in claim 4, and said pair of plate elements having adjusting slots, and fastener means on the plate body portion engaging in said adjusting slots.

8. A device to enable ripping of material as defined in claim 1, and an adjustable and lockable material guide on said table member in parallel relationship to said saw blade slot, said material guide comprising a T-square including a crosshead slidably engaging an edge of said table member, the table member having a second slot at right angles to the saw blade slot, and a clamping means for the material guide engaging the second slot.

9. A device to enable ripping of material by a portable power saw as defined in claim 7, and said one abutment member having a pair of spaced locator openings, and said fastener means comprising at least a pair of cooperative projections extending from said plate body to interlock in said locator openings.

10. A device to enable ripping of material by a portable power saw comprising
   a table member having a saw balde slot, first and second abutment members on the table member, means to adjust and lock at least one abutment member relative to the other whereby the space between said abutment members may be varied,
   a portable power saw positioning means carried by one abutment member including a plate body portion, a pair of opposing adjustable and lockable plate elements having inclined end faces which are convergent and adpated to engage upper portions of a portable saw sole plate to prevent upward and lateral displacement of the sole plate which also engages the other abutment member, said plate elements having adjusting slots, fastener means on the plate body portion engaging in said adjusting slots, and an adjustable and lockable material guide on said table member in parallel relationship to said saw blade slot.

11. A device to enable ripping of material as defined in claim 10, in which said first and second abutment members comprise a pair of parallel guide rails, and an adjustable material hold-down element on one of said guide rails.

12. A device to enable ripping of material as defined in claim 10, and said positioning means being separable from said one abutment member and having interlocking engagement therewith and being held in assembled relationship with said one abutment member by the sole plate of the power saw.

* * * * *